United States Patent
Rinke et al.

(10) Patent No.: US 11,307,557 B2
(45) Date of Patent: Apr. 19, 2022

(54) METHOD FOR ELIMINATING PROCESS ANOMALIES

(71) Applicant: Celonis SE, Munich (DE)

(72) Inventors: Alexander Rinke, Munich (DE); Martin Klenk, Munich (DE)

(73) Assignee: Celonis SE, Munich (DE)

( * ) Notice: Subject to any disclaimer, the term of this patent is extended or adjusted under 35 U.S.C. 154(b) by 13 days.

(21) Appl. No.: 17/018,296

(22) Filed: Sep. 11, 2020

(65) Prior Publication Data
US 2021/0041849 A1 Feb. 11, 2021

Related U.S. Application Data

(63) Continuation of application No. PCT/EP2018/056066, filed on Mar. 12, 2018.

(51) Int. Cl.
*G05B 19/406* (2006.01)

(52) U.S. Cl.
CPC .. *G05B 19/406* (2013.01); *G05B 2219/32179* (2013.01)

(58) Field of Classification Search
CPC ................................................ G05B 19/406
USPC ......................................................... 700/110
See application file for complete search history.

(56) References Cited

U.S. PATENT DOCUMENTS

| | | | | |
|---|---|---|---|---|
| 2008/0201618 | A1* | 8/2008 | Pfeiffer | G06F 11/1415 714/100 |
| 2009/0240366 | A1* | 9/2009 | Kaushal | G06N 5/04 700/110 |
| 2016/0110277 | A1* | 4/2016 | Edmondson | G06F 11/3452 718/102 |
| 2017/0102997 | A1* | 4/2017 | Purushothaman | G06F 11/0784 |

FOREIGN PATENT DOCUMENTS

| | | |
|---|---|---|
| DE | 10 2004 046 611 A1 | 3/2006 |
| JP | 2003-22117 A | 1/2003 |
| JP | 2003-263222 A | 9/2003 |
| JP | 2011-154526 A | 8/2011 |
| JP | 2012-104533 A | 5/2012 |
| JP | 2012-140648 A | 7/2012 |
| JP | 2017-199249 A | 11/2017 |

OTHER PUBLICATIONS

International Search Report issued for corresponding International Patent Application No. PCT/EP2018/056066, dated Nov. 12, 2018.

(Continued)

*Primary Examiner* — Mohammad Ali
*Assistant Examiner* — Joshua T Sanders
(74) *Attorney, Agent, or Firm* — Myers Wolin, LLC

(57) ABSTRACT

A method for monitoring process instances that are being executed and for eliminating process anomalies in the process instances is provided. In a monitoring step, a sensor, using a sensor definition, monitors a process log with respect to a process anomaly described in the sensor definition, and detects process instances or processes that have the process anomaly described in the sensor definition. In a correction step, for a process instance detected in the monitoring step, the process anomaly is eliminated at the runtime of the process instance.

15 Claims, 6 Drawing Sheets

(56) References Cited

OTHER PUBLICATIONS

Agrawal et al., "Chapter 7: Policy-Based Fault Management," Policy Technologies for Self-Managing Systems, IBM Press, pp. 139-145, Sep. 1, 2008.
Notice of Reasons for Rejection issued by the Japan Patent Office for corresponding Japanese Patent Application No. 2020-548752, dated Nov. 1, 2021, with English translation attached.

* cited by examiner

METHOD FOR ELIMINATING PROCESS ANOMALIES

CROSS REFERENCE TO RELATED APPLICATION

The present application is a continuation of International Application No. PCT/EP2018/056066, filed on Mar. 12, 2018, the contents of which are incorporated herein by reference.

FIELD OF THE INVENTION

The invention relates to a method for monitoring process instances that are being executed and for eliminating process anomalies in said process instances.

BACKGROUND OF THE INVENTION

More and more companies are using methods to analyze actual processes. The processes to be analyzed may have been executed in a computer system, with the help of a computer system or outside of a computer system. The processes executed outside a computer system can be technical processes, such as assembly processes, manufacturing processes, or the like.

An executed process is referred to as a process instance of a specific process. A process instance can comprise a number of process steps. Each process step usually generates data that are stored in a computer system. For example, the computer system can store who executed which process step of an order process and when. For an assembly process, for example, it is possible to store when which assembly step was executed with which parameters (for example the torque when fastening screws) during the assembly of a vehicle—the data for this can be provided by measuring transducers, for example.

From these stored data, information can be extracted that is relevant for the analysis of the processes.

These analyses are backward or retrospective analyses of already executed process instances, which can provide information about weaknesses in the processes in question. However, proactive intervention in the process instances to control faulty process instances is not possible because the faulty process instances have already been executed and therefore errors in individual process instances can only be detected after they have been executed. For example, for an assembly process of a vehicle, it can only be determined after the assembly process has been completed that the assembly of this vehicle has exceeded a predetermined assembly duration. With the methods known from the prior art it is at best possible to make improvements to process instances to be executed in the future on the basis of the analysis of process instances already executed. However, errors or anomalies—which can occur despite improvements to the process—in process instances that are currently being executed cannot be detected, let alone eliminated.

OBJECT OF THE INVENTION

Therefore, the object of the invention is to provide solutions making it possible to detect and eliminate errors or anomalies already during the execution of the process instances.

SOLUTION ACCORDING TO THE INVENTION

This object is achieved in accordance with the invention by a method according to the independent claim. Advantageous embodiments and refinements of the invention are specified in the dependent claims.

In methods for monitoring process instances that are being executed and for eliminating process anomalies in these process instances, it is therefore provided that each process instance comprises a number of process steps, wherein process data for the process steps of the process instances which have already been executed are stored in at least one process log, wherein the process data for each process step comprise at least
- an identifier of the process step,
- an identifier with which the process step can be uniquely assigned to a process instance, and
- an order of the process step within the process instance, wherein a process anomaly is described with at least one sensor definition, wherein a process anomaly is associated with a set of generic actions to eliminate the process anomaly, wherein (a) in a monitoring step a sensor, using the sensor definition, monitors the process log with respect to the process anomaly described in the sensor definition and detects process instances or processes comprising a plurality of process instances, that have the process anomaly described in the sensor definition, and (b) in a correction step, for a process instance detected in the monitoring step, the process anomaly is eliminated at the runtime of said process instance, wherein
- at least one generic action is selected from the set of generic actions assigned to the process anomaly,
- based on the selected generic action, a process intervention instance specific to the detected process or the detected process instance is created, and
- the process intervention instance is executed to eliminate the process anomaly of the detected process instance or detected process.

A process anomaly is an error in a process instance that is being executed. However, a process anomaly can also be a deviation of a process instance from a specified target value, although the deviation does not necessarily have to be an error, for example if a torque with which a screw is fastened exceeds a target torque but is still below a maximum permissible torque.

With the method according to the invention, active intervention in process instances that are being executed is possible. For example, it is possible to intervene in a specific technical process (for example in a pasteurization process) if the sensor detects an anomaly in the monitoring step (for example the exceeding of the pasteurization temperature). By intervening in the process, the anomaly can be eliminated (for example the pasteurizer can be caused to reduce the supplied heat energy).

In an embodiment of the invention, for each process step, the process data during the execution of the process step or at the end of the process step are stored in the process log.

The sensor definition can contain data and/or instructions that are used select process instances and/or processes from the process log in the monitoring step that fulfill a predetermined selection criterion.

The selection criterion can be
- at least one static or dynamic parameter,
- at least one predetermined pattern, and/or
- at least one parameter that can be defined by pattern recognition, wherein, in the case of a deviation or non-deviation from the selection criterion, the selection criterion is fulfilled and a deviation or non-deviation from the selection criterion is indicative of a process anomaly.

A process instance can have a number of sub-process instances, wherein the process steps of the sub-process instances can be executed in different source systems, and wherein the process data for the already executed process steps of the sub-process instances are combined in the at least one process log.

On the one hand, the process data are thus stored in a central process log, even if the sub-process instances are executed in different systems (for example if a sub-process of an assembly process is executed with a first assembly machine and another sub-process of this assembly process is executed with a second assembly machine).

In an embodiment of the invention, the sensor definition may include information regarding the times at which the monitoring step is performed. Depending on requirements, real-time monitoring of process instances currently being executed is also possible.

It can be advantageous if the process log is filtered according to predetermined filter criteria before the monitoring step, wherein the filtered process log is the basis for the monitoring step. Therefore, the amount of entries to be checked in the process log can be reduced if necessary, which is especially advantageous if the process log contains a lot of data (for example process data of several hundred million process steps). The processing speed can thus be increased.

In an embodiment of the invention, the process data stored in the process log can be linked with further auxiliary data describing the particular process instance and/or the particular process step, wherein, when the process intervention instance is generated, it is parameterized with the auxiliary data. This makes it possible to create a process intervention instance adapted to the particular process instance (for which an anomaly is to be eliminated) and to extend the sensor definition by data not stored in the process log.

The process intervention instance can have a number of non-invasive actions and/or a number of invasive actions, wherein
 the non-invasive actions are executed outside the source system in which the particular process instance is executed, and
 the invasive actions are executed in the source system in which the particular process instance is executed.

With an invasive action the course of the particular process instance in the source system can be changed and/or controlled.

The non-invasive actions and/or the invasive actions can be converted into executable instructions for the particular source system.

The selection of the at least one generic action from the set of generic actions associated with the process anomaly may be performed in such a way that, for a number of actions or combinations of actions contained in the set of generic actions, a simulation is performed in which it is determined which action or combination of actions applied to the process instance leads best to a predetermined result, wherein this action or combination of actions is selected. For several potentially applicable actions, an "optimal" action or combination of actions can be selected, thus avoiding the need to "test" an action or combination of actions on the running process instance.

The filter criterion can be formed by at least one attribute of the process log and the characteristics that this attribute can assume, the characteristics being assigned to a user, wherein, by assigning the characteristics of the attribute to the user, the process anomalies occurring in the filtered process log are also assigned to this user.

It is particularly advantageous if the process log is stored in a main memory of a computer system, preferably in such a way that successive process steps of a process instance are stored in adjacent memory cells. Therefore, the process log can be read from the memory as a continuous stream, i.e. memory cell by memory cell. Complex addressing or addressing processes (for example, to map references between successive process steps of a process instance), which are detrimental to performance, can thus be avoided. If it is known how many memory cells are utilized by a process instance, these can also be read in blocks.

The monitoring step can be performed by an anomaly detection engine, and the correction step can be performed by an anomaly correction engine, wherein
 the anomaly detection engine controls the execution of the sensor, the execution of the sensor being triggered according to the time points specified in the sensor definition, and
 the anomaly detection engine passes information about the process instances detected by the sensor to the anomaly correction engine.

The anomaly detection engine and the anomaly correction engine can be executed in one computer system.

BRIEF DESCRIPTION OF THE DRAWINGS

Details and features of the invention as well as specific embodiments of the invention will become clear from the following description in conjunction with the drawings, in which.

DETAILED DESCRIPTION OF THE INVENTION

Figure 1:
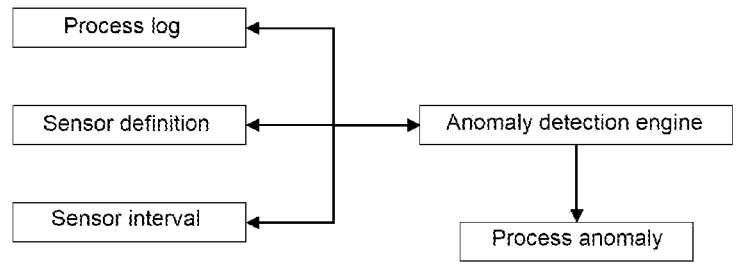
FIG. 1 shows a block diagram of an anomaly detection engine.

The invention makes it possible, for the first time, to monitor the execution of process instances and to intervene in a process instance during its execution order to eliminate an error or anomaly in this process instance. In this sense, a process that is being executed is also referred to as a process instance of this process.

The error or anomaly is eliminated in accordance with the invention by executing a process intervention instance, which is generated during the execution of the process instance depending on the detected error or anomaly. Such a process intervention instance can be used, for example, to influence or control the further course of the process instance.

For example, in a source system in which an order process is executed, a payment block can be initiated if a supplier's invoice is received before the ordered goods are delivered. According to another example, an assembly machine for printed circuit boards can be prompted to change the placement order of the components still to be mounted in an ongoing assembly process if there is a risk that the maximum placement time will be exceeded due to the last mounted components.

A process intervention instance therefore contains one or more instructions adapted to change or control the corresponding process instance. In the above example of the order process, this instruction can be, for example, an SAP® transaction that is used to initiate the payment block when the order process is executed in an SAP® system. In the example of the placement machine, the instructions can be interpretable instructions from the placement machine that cause the placement machine to change the placement order accordingly.

According to the invention, any type of process instances can be monitored, and anomalies or errors be eliminated during the execution. In particular
  process instances executed exclusively in a computer system (for example instances of an order process or instances of a payment process),
  process instances performed exclusively by technical devices (for example an assembly process performed by one or more assembly machines or a painting process performed by a painting robot), and
  process instances that are partly executed in a computer system and partly by technical devices (for example a just-in-time production process that includes an order process executed in a computer system and a production process executed by production machines),
can be monitored and anomalies or errors eliminated during execution.

A process instance usually comprises a number of process steps. For example, an instance of an order process can include a step to check the availability of a product, a step to order a certain quantity of the product, and a step to receive an order confirmation. An instance of a coating process executed by a coating machine can include a step to request a specific color from a color store, a step to apply the color to the item, and a step to apply a clear coat.

For the already executed process steps of a process instance that is currently being executed, process data are stored in a process log. In addition to the process data to be stored in the process log, further data can be generated or accumulated during the execution of the process steps and do not have to be stored in the process log. The process data and these further data are referred to, in their entirety, as source data. It can be advantageous to store the source data in the source system (for example in the computer system in which an order process is executed or in a storage device assigned to an assembly facility) and to extract the process data from the source system and store the extracted process data in the process log.

It is advantageous here if the process data is stored in the process log in real time, i.e. immediately after the execution of the corresponding process step. This also enables real-time monitoring (or approximate real-time monitoring) of the process instances, which in turn enables real-time intervention or control of the process instance. This is especially important if the process steps of a process instance are executed at short time intervals (for example in a placement process in which a large number of components are mounted on a printed circuit board within a few seconds).

The process log contains at least the information of which process steps for which objects (for example orders, production goods, logistics procedures, assembly processes) took place at what time. i.e. for each process at least
  an identifier of the process step,
  an identifier with which the process step can be clearly assigned to a process instance, and
  an order of the process step within the process instance.

The order of the process step within the process instance can be specified by a consecutive unique number or by a timestamp (for example, the execution time of the process step). Other ways of specifying the order are possible, for example by referencing a process step to its subsequent process step.

In addition, the process log can be used to provide master data information regarding the objects or process instances, such as the quantity and price of an order, the production type of a product, the transport route of a logistics operation, or the maximum duration and temperature of a pasteurization process. This master data information can either be stored in the process log or can be referenced by the process step identifier or the process instance identifier. This master data information is also referred to as auxiliary data.

A process instance can have a number of sub-process instances, wherein the process steps of the sub-process instances can be executed in different source systems. For example, a procurement process (=process instance) can include an ordering process (=first sub-process instance) and a payment process (=second sub-process instance), wherein the ordering process is executed in an ordering system and the payment process in an accounting system. In a production process (=process instance) the grinding (=first sub-process instance) of a component can be done by a grinding machine and the painting (=second sub-process instance) of the component can be done by a painting robot.

The process data of the executed process steps of the partial process instances can be stored in separate process logs. However, it is advantageous if the process data of the sub-process instances are stored or combined in a common process log.

The process steps of a concrete process instance are also referred to as a process path hereinafter. Accordingly, a process log has a number of process paths.

In the case of a process instance executed in a computer system, the process data are usually provided by this computer system. The computer system in which a process instance is executed is also referred to as the source system. In the case of process instances that are executed by technical equipment, such as production machines, the process data are usually provided by the particular technical equipment, such as measuring transducers (for example a torque and angle sensor of a bolting process). The technical equipment is also referred to as a source system. The source system is therefore the system that executes the process instance. If a process instance is executed by several source systems (for example a first sub-process instance of source system A and a second sub-process instance of source system B), these source systems are jointly referred to as a source system.

The term "process anomaly" is also used hereinafter. A process anomaly is an error occurring in a process instance that is being executed or in the course of a process instance and leads to unwanted results or deviates from a predetermined target process.

It is advantageous if the process log is stored in a main memory of a computer system, preferably in such a way that successive process steps of a process instance are stored in adjacent memory cells. The process steps can thus be read out of the main memory as a continuous stream and in the correct order. Complex sorting processes can thus be omitted.

FIG. 1 shows a block diagram of an anomaly detection engine to illustrate the sub-process for monitoring process instances being executed and the mechanism for uncovering or detecting process anomalies.

The basis for the anomaly detection engine is the process log, which also forms the data input for the anomaly detection engine. The anomaly detection engine is adapted to monitor the process log and detect anomalies in all or selected process instances stored in the process log.

The anomaly or anomalies to be detected in a process log or for process instances in the process log are characterized by one or more sensor definitions. In a monitoring step, a sensor of the anomaly detection engine monitors the process log for process anomalies described in the sensor definitions using the sensor definitions. At the same time, the sensor detects process instances or processes comprising a plurality of process instances that have the process anomalies described in the sensor definition.

The sensor definition can refer both to anomalies/problems in business processes as well as anomalies/problems in technical processes. For example, environments in the context of business processes are purchasing processes, sales processes, billing processes, IT service management, web analytics or master data management. Examples of technical processes include logistics processes, production processes or assembly processes.

The following are examples of different classes of anomalies that can be monitored and detected with the anomaly detection engine according to the invention, although other classes of anomalies are also possible.

Timeout class: A timeout is characterized by the fact that an activity B does not occur or is not executed within a predefined time span after the occurrence of an activity A, i.e. a predefined time span between two activities or process steps of a process instance is exceeded.

Examples

Raw materials must be ordered to carry out a production process. The raw materials are not ordered within the specified time span, and so the customer order associated with the production process cannot be fulfilled by the customers desired date.

The prescribed heating time for pasteurization of milk is exceeded.

Time undershoot class: A time undershoot occurs when a minimum time difference between two process steps of a process instance is undershot.

Examples

A suppliers delivery of hazardous goods occurs before the specified delivery date and leads to an overflow of the hazardous goods warehouse.

The minimum cooling time required for hardening steel in the quenching process is not observed.

Illegal process pattern class: An illegal process pattern is characterized for example by an illegal chronological order of process steps of a process instance or by an illegal combination of process parameters of a number of process steps of a process instance.

Examples

A suppliers invoice is issued before the ordered goods are received.

The assembly order is not observed when assembling a machine under machine control.

Violation of responsibilities class: A violation of responsibilities occurs if, for example, two different process steps of a process instance are executed by the same person (or in technical processes by the same object/machine).

Examples

The approval of a supplier invoice and the payment of the same invoice is carried out by the same person, thus violating the four-eyes principle.

Initial assembly and inspections for a wheelbase during vehicle construction are carried out using the same measuring device.

The classes of anomalies mentioned above and the corresponding examples refer the detection of anomalies in individual process instances or in individual process paths.

In addition to the process-instance-specific detection of anomalies, the method according to the invention also enables the monitoring and detection of anomalies across process instances. In this way it is possible to determine, for a process (=instances of this process) as a whole, whether it is in a normal or abnormal state. For example, the following types of anomalies can be monitored and detected.

Anomaly of the "accumulation" type: An anomaly of the "accumulation" type refers the unusual accumulation of the occurrence of a certain process step over a number of process instances. The attribute "unusual" can refer either to a statically predefined reference value or a dynamically determined value from the past.

Examples

The rejection rate of customer orders increases unusually strongly,

The percentage of rejects in a production process increases significantly from a statistical point of view.

Anomaly of the "throughput time" type: A throughput time anomaly describes the unusual temporal development of the throughput time between two process steps across a number of process instances. With the method according to the invention, a significant deviation from a static reference value or from a dynamically determined reference value can be determined from the throughput time values of the past.

Examples

The release process (for example the time between the creation and release of an order) suddenly takes an unusually long time across a number of process instances.

The idle time of a product within the production system assumes unusually high values.

The sensor definition comprises data and/or instructions that are used to select process instances and/or processes from the process log in the monitoring step that fulfill a predetermined selection criterion, Examples of a predetermined selection criterion are given above for the classes of anomalies or types of anomalies.

In the example of the heating time in the pasteurization of milk mentioned above for the "timeout" class, the instruction or selection criterion of the sensor definition could be: "Find all process instances of the process 'pasteurization of milk' where the heating time in the heating step is greater than 8 minutes." The heating time is recorded by a timer and provided for storage in the process log. As soon as the process step "heating step" has been executed for a process instance of the process "pasteurizing milk," a corresponding entry in the process log is generated for this process step. The heating time can be stored directly in the process log. Alternatively, the heating duration for this process step can be saved in an external table referenced from the process log. Immediately after creating the corresponding entry in the process log, the sensor of the anomaly detection engine, which monitors the process log according to this sensor definition, can detect this anomaly and pass the detected anomaly to an anomaly correction engine (which is described in further detail below) to eliminate this anomaly.

In the above example of heating duration in the pasteurization of milk, the instruction or selection criterion of the sensor definition can alternatively read as follows: "Find all process instances of the process 'pasteurization of milk' where more than 8 minutes have elapsed since the start of heating." The start of heating can be indicated in the process log, for example, by a time stamp. This means that the heating time is not itself stored in the process log. Rather, the particular sensor checks continuously (for example every 5 seconds) whether, since the start of the heating, the pre-defined heating duration (here 8 minutes) was already exceeded.

This alternative sensor definition has the fundamental advantage compared to the first sensor definition that, already during the execution of the heating step, an exceeding of the predefined heating time can be detected or recognized (with the first sensor definition, however, an exceeding of the pre-defined heating time can be detected only after the end of the heating step). This allows the anomaly correction engine to intervene in the current heating step by means of a corresponding process intervention instance and, for example, to provide instructions to a pasteurizer to cause the pasteurizer to stop the heating step immediately.

The above-mentioned classes and types of anomalies for process instances and processes as a whole can be described in accordance with the invention in a sensor definition, i.e. they can be defined in the sensor definition with the help of data and/or instructions or selection criteria.

The three types of sensor definitions described below can be provided.

Sensor definition for the anomaly by exceeding/falling below a statically defined parameter (static sensor): The above-described examples of process-instance-dependent anomalies can be considered in the sensor definition insofar as a given parameter (a time interval, a target order of process activities, etc.) is not observed and the corresponding process instance therefore shows an anomaly.

Sensor definition for anomalies by means of pattern recognition: The anomalies of the above-mentioned "accumulation" and "throughput time" types for anomalies are examples of pattern recognition supported by the invention. Based on a reference time period in the past, typical patterns from process instances of a process are extracted and deviations from these patterns during the observation period can be detected as a process anomaly.

Examples

The sensor of the anomaly detection engine continuously scans the rate of manual intervention in a procurement process (for example manual changes in order prices or quantities). If, during the current week (=observation period), characteristics arise which differ significantly from the level and fluctuation of the rate in the reference time period (for example the past year), a process anomaly is detected which can be eliminated by an anomaly correction engine.

In a manufacturing process, a certain product is produced according to certain specifications. Compared to the production quantities in the past, the sensor detects that the production quantity in the observation period is suddenly noticeably low. The anomaly correction engine can intervene in the manufacturing process to bring the production quantity back to the desired level.

Sensor definition for anomalies by exceeding/falling short of a parameter dynamically determined by pattern recognition: In extension to the static sensor described above, it is possible in accordance with the invention to determine the parameter for the delimitation of an anomaly dynamically by means of a pattern recognition process. After specification of a parametric model, the calibration of the parameters is carried out on the basis of patterns in a reference period. The parameters determined in this way can be used as a basis for the detection of anomalies, just like with a static sensor.

The following is a detailed example for a sensor definition or for a sensor.

An exemplary sensor definition is considered, with which a sensor of the anomaly detection engine can detect outstanding deliveries from the USA and Germany in a process log.

The process log, which contains at least one identifier of the process steps, an identifier with which the process steps can be unambiguously assigned to a process instance, and an order of the process steps within the process instances (=minimum attributes of the process log), is enriched in this example with auxiliary data to enable the sensor to detect outstanding deliveries from the USA and Germany. The process log thus contains the minimum attributes of the process log and the necessary auxiliary data.

In addition to the minimum attributes of the process log mentioned above, the auxiliary data are also included in the definition of the sensor definition. All components relevant for this example are listed below.

1. The minimum attributes of the process log, i.e. the process steps with the corresponding assignments to a process instance and their execution times are stored here in a "process steps" table.

TABLE

| process steps | | |
|---|---|---|
| ID | Process step | Entry date |
| 10829382 | Order position created | 2018 Jan. 3 |
| 10829382 | Order confirmation received | 2018 Jan. 4 |
| 10829382 | Delivery date confirmed | 2018 Jan. 24 |
| 10182731 | Order position created | 2018 Feb. 1 |
| 10182731 | Order confirmation received | 2018 Feb. 4 |
| 10182731 | Delivery date confirmed | 2018 Feb. 5 |
| 10182731 | Invoice received | 2018 Feb. 9 |
| 20173621 | Order position created | 2017 Dec. 2 |
| 20173621 | Order confirmation received | 2017 Dec. 8 |
| 20173621 | Delivery date confirmed | 2017 Dec. 20 |
| 20173621 | Goods received | 2017 Dec. 20 |
| 20173621 | Invoice received | 2017 Dec. 21 |
| 20173621 | Invoice paid | 2017 Dec. 23 |
| . . . | . . . | . . . |

The "ID" column identifies the process instance, the "Process step" column identifies the process step within the process instance, and the "Entry date" column identifies the time when the process step in question was executed. The column "Entry date" also defines the order of the process steps within a process instance.

2. A list of all orders (which, for example, can be stored in a database in an "Orders" table), consisting of the identifier of the order (ID=order number) and an identifier of the particular supplier. Further attributes, which are not necessary for the sensor definition according to this example, can be provided, for example the currency and the order value.

| Orders table | | | |
|---|---|---|---|
| ID | Supplier | Net value | Currency |
| 10829382 | 318623 | 1000 | EUR |
| 10182731 | 327462 | 2000 | USD |
| 20173621 | 621531 | 1500 | EUR |
| ... | ... | ... | ... |

3. Information regarding suppliers. This is necessary for the restriction to outstanding shipments from the USA and Germany and are stored in many source systems in form of a central master data table (here "Suppliers" table). This table contains at least an identifier of the suppliers and the country assigned to the particular supplier. Other attributes that are not necessary for the sensor definition according to this example may be provided, such as the phone number of the supplier.

| Suppliers table | | |
|---|---|---|
| Supplier | Country | Phone number |
| 318623 | GER | ... |
| 327462 | USA | ... |
| 621531 | GER | ... |
| ... | ... | ... |

A possible sensor definition with which a sensor of the anomaly detection engine can detect outstanding shipments from the USA and Germany in a process log could be as follows (according to a pseudo code):

```
FILTER
process equals 'Order confirmation received'
and process not equals 'Goods received'
and process not equals 'Send reminder'
and "suppliers"."Country" IN ('USA', 'GER')
and DAYS_BETWEEN
  (
    PU_MAX("Orders", "Process steps". "Entry date", "Process steps."
    "Process step" = 'Confirmed delivery date', TODAY( ))
  )>= 7
```

The filter condition (FILTER) examines the entire process log for the specified criteria and returns exactly those orders in which the criteria are violated and thus show an anomaly.

The three "process-equals" expressions limit the data set to those orders for which the suppliers order confirmation has already been received, but for which no goods have yet been received and no reminder has been sent. i.e., the process log is reduced to open orders (in the sense of goods not received).

The conditions for the supplier origin ("Supplier". "Country" IN ('USA', 'GER')) ensures that only German and American suppliers will be taken into account for the desired application. In general, any attributes of the process log can be used here.

Finally, the "DAYS_BETWEEN . . . " condition specifies the anomaly condition (in this case for the timeout). As soon as there are at least seven days between the observation date and the last confirmed delivery date, the delivery is considered delayed and therefore constitutes an anomaly.

The PU_MAX function is intended to determine the date furthest in the future for an order item.

If the sensor of the anomaly detection engine with the above sensor definition is applied to the above example of a process log, then anomalies for the orders 10829382 (19 days delay) and 10182731 (seven days delay) will occur at the observation time Dec. 2, 2018 (for example, sensor execution time). However, order 20173621 is not an anomaly, since, among other things, the goods have already been received and the condition "process not equals 'Goods received'" is therefore not satisfied.

The sensor itself can be executed at fixed times, for example cyclically every two days, or every Monday and Wednesday. Alternatively, the execution of the sensor can be triggered by an entry in the table "Process steps," i.e. as soon as a new entry is added to this table, the sensor is executed. Triggering of the sensor by adding an entry to the process log can be advantageous when real-time or near-real-time anomaly detection is required to be able to eliminate anomalies also detected in real-time.

Any process steps and attributes can be included in the sensor definition, and arbitrary arithmetic operations can be performed on them for anomaly detection. An example of an ordering process is shown above. Corresponding sensor definitions can also be defined for technical processes (for example manufacturing processes), The possibilities for the sensor definition are ultimately only limited by the data stored in the process log.

For example, a sensor definition can be defined for a painting process in the automotive mobile industry in which components are painted by a painting robot. After a painting process, a measuring instrument can measure the applied paint thickness and store this measured value in the process log for the corresponding process instance (=painting process). A corresponding sensor in the anomaly detection engine can monitor and detect this process log if a paint layer that is too thin is applied to a component. The anomaly detection engine can then provide information about detected process instances to the anomaly correction engine described below, which can then generate appropriately adapted process intervention instances. With the process intervention instances, the anomaly correction engine can instruct the painting robot to apply another coat of paint to the part. A possible sensor definition for this sensor could be as follows (according to a pseudo code):

```
FILTER
  process equals 'Painting process completed'
  and process not equals 'Part has left the painting area'
  and "Parts". "Paint thickness" <1.5 mm
```

A sensor according to this sensor definition returns all process instances (painting processes) where the painting process is complete, the paint thickness is less than 1.5 mm, and the corresponding part has not yet left the painting area. The anomaly correction engine can then instruct the painting robot to paint the part again.

If, in the above-mentioned sensor definition, the second condition is replaced by
  and process equals 'Part has left the painting area', the anomaly correction engine could then instruct a transport device (for example a storage robot) to transport the part back into the painting area to repaint it.

The sensor definitions described above and anomaly detection using a sensor based on a process log offer several technical advantages, some of which are listed below.

By combining, potentially, a plurality of components (minimum attributes of the process log and auxiliary data) of a source system, it is possible to provide sensors that can take into account the order of process steps within a process instance as well as other dependencies between the process steps. This dependency can even extend over a number of processes and process types, i.e. a sensor can consider dependencies between process steps that belong to process instances of different processes or that belong to different process instances of one and the same process. For example, production, logistics and sales processes in a company can be linked, thus allowing one sensor to detect anomalies across a number of process instances. Example: An anomaly in a production process (for example a timeout in a manufacturing process) can be associated with the unavailability of a carrier that was actually reserved earlier, which can affect the delivery to a customer by a confirmed date. The definition of an overarching sensor allows the imminent delay of the deadline to be detected at the time of the production disruption.

A number of system landscapes can be taken into account. Singular anomaly detection systems are monosystemic and therefore only able to detect deviations within a system landscape (for example processes or process instances that are executed within a specific system, for example within an SAP® system or within a production plant). With the help of the process log, processes or process instances that are executed in different systems can be merged and thus monitored by one sensor. Example: An ordering process and a production process are executed one after the other for a specific product and together form a procurement process. Process data of the ordering process, which is executed in an SAP system, and process data of the manufacturing process, which is executed by a production machine, are stored in a common process log. A sensor can thus monitor the entire procurement process and detect anomalies within the entire procurement process, although the ordering process and the manufacturing process are executed in different systems.

A further technical advantage of the invention results from the three types of sensor definitions (static parametric model, pattern recognition, dynamic parametric model). In particular, the sensor definitions by means of pattern recognition and by means of a dynamically parameterized model enable an automated anomaly detection, which cannot be implemented manually, i.e. is only possible with the help of the computer-implemented method according to the invention.

Furthermore, different sensors can be condensed into a single signal, thus providing a higher-level sensor for the detection of fundamental process weaknesses. Heterogeneous singular signals from individual sensors can thus be recorded in parallel and simultaneously evaluated.

A higher-level sensor is also referred to as a meta-sensor. A meta-sensor uses existing sensors as input, so that a meta-sensor can be seen as a sensor that monitors existing sensors. This makes it possible, for example, to detect accumulations of certain anomalies across multiple sensors, which will be explained in greater detail on the basis of the following example.

In the anomaly detection engine, various individual sensors are defined that monitor the process log for certain anomalies and detect these anomalies, for example:
a sensor that detects the increase of an order price in an order position by the supplier,
a sensor that detects the shift of a delivery date in an order position by the supplier, and
a sensor that detects the increase in the quantity requested in a customer order by the customer.

These three sensors have, for example, the attribute "material number" in common, i.e. when a corresponding anomaly is detected, the sensors can provide data that includes the material number of the corresponding process instance. For example, a meta-sensor can now be provided that detects anomalies of the "accumulation" type, for example regarding the material number. The meta-sensor provided in this example can now detect that, during the current week, an accumulation occurs across the individual sensors for a certain material (here indicated by the material number). This accumulation may indicate that a shortage of this material is imminent.

The anomaly detection engine, which also runs and controls the meta-sensor, can now provide information about the detected accumulation to the anomaly correction engine. The anomaly correction engine can then generate appropriate process intervention instances, for example to actively and automatically trigger a goods management system to build up the stock of this material, for example by ordering additional material from alternative suppliers.

Such accumulations can only be detected by a computer system, since on the one hand a large number of sensors can detect different anomalies, which can all contribute to a certain accumulation, and on the other hand each sensor can detect a very large number of process instances, which can each influence the certain accumulation differently quantitatively.

With the sensors and sensor definitions described above, anomalies in process instances can be detected during the execution of the process instances. An anomaly detection engine that runs the sensor passes the detected process instances or information about the detected process instances to an anomaly correction engine that is adapted to remove the anomaly or anomalies in the detected process instances. The removal of the anomaly takes place during the execution of the particular detected process instance, i.e. the process instance is actively interfered with and, for example, the further execution of the process instance is controlled. Furthermore, the anomaly detection engine passes, to the anomaly correction engine, the sensor definition (or the sensor) on the basis of which the sensor detected the process instances.

Figure 2:
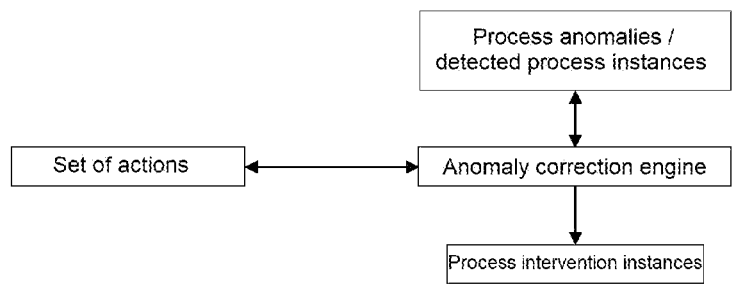
FIG. 2 shows a block diagram of an anomaly correction engine.

FIG. 2 shows a block diagram of an anomaly correction engine to illustrate the sub-process for correcting process instances that are being executed. "Correction" here means that anomalies of a process instance are eliminated or removed. The anomaly detection engine and the anomaly correction engine can be run on different systems connected to a communication network.

The anomaly correction engine is configured to assign a set of generic actions to each possible sensor definition or each possible sensor. The generic actions associated with a sensor can be used to "correct" the process instances detected by that sensor.

Once the anomaly correction engine has received a process instance from the anomaly detection engine together with the particular sensor definition or together with the particular sensor, at least one generic action is selected from the set of generic actions. If the set of generic actions assigned to a sensor contains more than one generic action, the selection of a generic action can be based, for example, on one or more attribute values of the particular process instance, or on a simulation to determine the most suitable action, as described below.

The generic actions each define a specific action with which an anomalous process instance can be corrected. The definition of the generic action is source-system-independent. For example, a generic action "Create reminder" is defined to eliminate an anomaly in a process instance being executed in an SAP® system or in a process instance being executed in a Salesforce system.

Based on the selected generic action, a process intervention instance specific to the particular detected process instance is created. In contrast to the generic action, the process intervention instance is source-system-dependent. In the above example, for the generic action "Create reminder," different process intervention instances would be created for the SAP® system and for the Salesforce system.

The process intervention instance itself is, in turn, adapted to eliminate the anomaly in the specific detected process instance. This adaptation can be implemented, for example, via parameters of the process intervention instance to which attribute values of the particular process instance, for example a unique identifier of the process instance, can be passed. Other types of such an adaptation are also possible.

The process intervention instance is then converted into an executable instruction by the source system (in which the detected process instance is executed). These instructions are then transferred by the anomaly correction engine to the corresponding source system and executed there.

In an embodiment of the invention, a process intervention instance may comprise a number of activities. These activities are also converted into instructions executable by the source system and then transferred by the anomaly correction engine to the corresponding source system for execution. This embodiment is especially advantageous if, in order to eliminate the anomaly of a detected process instance

- a number of, for example, independent activities must be executed in the source system, or
- a number of activities have to be executed in different source systems. For example, a painting robot applies too thin a layer of paint: this can lead to a delay in the promised delivery date. The generic action for eliminating this anomaly could be "Repeat paint step." Based on this generic action, a process intervention instance is created, comprising a first activity and a second activity. With the first activity, the painting robot can be induced to apply an additional layer of paint. With the second activity, an ERP system can be prompted to inform the customer of a new delivery date. For both activities, the anomaly correction engine generates appropriate instructions and transmits them to the painting robot or ERP system.

In accordance with the invention, two types of process intervention instances or activities are provided, namely

- non-invasive activities or process intervention instances, and
- invasive activities or process intervention instances.

Non-invasive activities or process intervention instances refer to activities that are executed outside the affected source system. According to the invention, any information from the process log can be evaluated.

In the case of a hazardous goods overflow (see above example for the time undershoot anomaly class), for example, the material group of the material causing the overflow or the supplying manufacturer can be determined and visualized.

Besides the static visualization of information from the process log, the anomaly correction engine also supports the dynamic information calculation. For example, it is possible to calculate automatically for the hazardous goods warehouse, using the existing delivery schedules to the customers, when which capacities will become free and when the overflow will end, without further intervention.

Another example of a non-invasive activity is the call-up of a process analysis, with which the entire process of a process instance can be visualized and evaluated based on the process log. Additional information such as process indicators can be calculated and displayed. The anomaly correction engine can, to this end, link a detected anomaly with a process analysis belonging to the process log, so that an activity can be executed, with which, for a detected anomaly, an analysis of the underlying process can be executed directly. The information required for the analysis is contained in the process log (minimum data of the process log and auxiliary data), wherein the minimum data of the process log and the auxiliary data are linked to each other accordingly. This makes it easy to filter the process log in respect of a certain process instance or in respect of the process instances of a certain process, so that only the data belonging to these process instances are included in the analysis. This allows easy verification of the detected anomaly.

Invasive activities or process intervention instances, on the other hand, refer to activities that are executed within the affected source system and thus trigger changes in the source system to eliminate anomalies or actively make improvements in the executed process instance.

Invasive activities may include instructions that
- are executed exclusively in a computer system,
- are carried out exclusively by technical devices (for example an assembly machine), or
- are partly executed in a computer system and partly by technical devices, to eliminate the anomaly.

In the above example of the unauthorized process pattern by receipt of a supplier's invoice before the ordered goods are received, the process intervention instance generated by the anomaly correction engine can include invasive activity that sets a payment block for the corresponding order in the source system (for example in an ERP system where the ordering process is executed). The anomaly correction engine with the corresponding process intervention instance thus intervenes in the process instance flow.

In the above-mentioned example of a machine assembly order not followed, the anomaly correction engine can create a process intervention instance with an invasive activity, wherein the invasive activity causes an assembly machine to change the assembly order of the parts that are yet to be assembled.

In the above example of timeout in a production process, a first invasive activity can trigger an acceleration of the subsequent production steps executed by a machine to be completed on time. In addition or alternatively, a second invasive activity can be used to trigger an ERP system to inform the carrier and the customer of a delayed delivery.

This is also an example of how instructions can be executed partly in a computer system and partly by technical devices.

In the event of a hazardous materials warehouse overflow, the anomaly correction engine can create a process intervention instance that can trigger an automated inventory rebalancing or early delivery of stored hazardous materials to create additional capacity.

According to the invention, three types of process intervention instances can be created:

Statically generated process intervention instances can be limited to the reproduction of information statically obtained from the process log associated with the anomaly. This includes, for example, the display of attributes of the anomaly, such as the supplier and reference document number in the case of late delivery, the acting personnel in the case of a process compliance violation, or the duration of the timeout in a pasteurization process.

For dynamically generated process intervention instances, meta-information of the anomaly and the source system that goes beyond the process log is included. One result of this is, for example, the linking of an anomaly with a process analysis belonging to the process log or the generation of an activity that can be executed in the source system (=invasive activity).

According to a third type, an optimal action for the creation of a process intervention instance is determined from the set of generic actions by means of a simulation. For example, for all possible generic actions, it can be determined how the lead time of a process instance changes when the actions are applied to the process instance, and the action for creating the process intervention instance can be selected where the determined lead time comes closest to a target lead time.

Following on from the above example, where an anomaly detection engine sensor detects outstanding deliveries from the USA and Germany, a desirable action may be to send targeted reminders to the affected supplier. This is an example of a dynamically generated invasive action, since on the one hand attributes of the anomaly are included in the generation of the process intervention instance, and on the other hand a direct execution of the process intervention instance (in the form of executable instructions) and thus a change in the source system is brought about. In this case, "dynamic" means that, for example, supplier number is included in the creation of the process intervention instance order to specifically remind the relevant supplier. "Invasive" means that the reminder is generated directly in the source system.

The process intervention instances described above and their generation offer several technical advantages, some of which are listed below.

The generic actions can be defined uniformly for any modules within a system and for different source systems. Only when the process intervention instances are executed do source-system-specific instructions have to be generated, which can also be generated by the source system itself in an embodiment of the invention if the anomaly correction engine provides the source system with the information required for this purpose. In particular, anomalies which require the simultaneous invasive intervention in a number of systems to eliminate the anomaly are a necessary prerequisite for active control of an overall process.

A further advantage is the described linking of an anomaly with a process analysis associated with the process log. This provides an efficient method to investigate anomalies in a targeted manner, to understand their process flow in detail and to select the most suitable option for action.

Another important technical advantage is the ability to determine the most suitable action by means of a simulation. This makes it possible, for example, to simulate the effect of different arrangements of the assembly order in a production process or the development of the stock of hazardous material when planned delivery times are adjusted, and to select the option that is most likely best. However, it is not possible to manually "try out" the process instance that is currently being executed.

Figure 3:
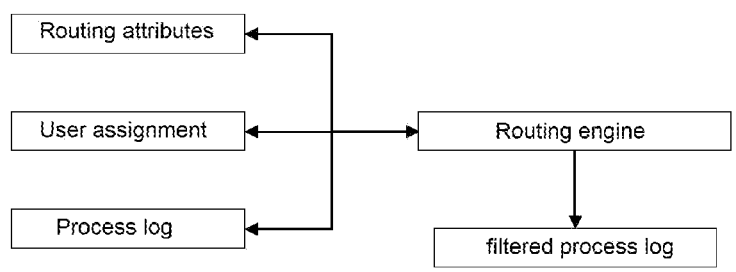
FIG. 3 shows a block diagram of the routing engine.

According to another aspect of the invention, the assignment of process intervention instances to the responsible and handling agents can be provided for an effective process control. This aspect of the invention is further described with reference to FIG. 3, which shows a block diagram of a routing engine. The task of the routing engine is to limit the process log for a given user already in such a way that all anomalies occurring therein correspond to the process instances to be processed by the user.

Incoming parameters of the routing engine are the process log, an assignment attribute (which can be an attribute of the process log), and characteristics (values) of the assignment attribute which are to be assigned to a given user.

Example

A specific buyer is responsible for a purchasing position in the ordering process and is assigned to the purchased material via the material master of the source system. In this case, the assignment attribute is the material number and the value of the assignment attribute assigned to the buyer is the material number of the individual purchasing position.

Based on the incoming parameters, the routing engine compares the process log for a given user with regard to all characteristics of the assignment attribute and the characteristics assigned to the user and returns that part of the process log which matches the characteristics of the assignment attribute assigned to the user. The result is a filtered process log that can be monitored by the anomaly detection engine (see also FIG. 4).

A technical advantage of the routing engine is that the restriction of the process log to the process anomalies relevant for the user is carried out automatically. A manual assignment is not possible when considering the typically extremely high number of individual process instances (several million) in the process log.

In addition to the attributes of the process log, attributes of the anomaly can also be included in the assignment. The assignment of process instances by means of the routing engine to individual users is advantageous if the anomaly detection engine detects an anomalous process instance and the anomaly correction engine generates a process intervention instance, but the execution of the process intervention instance must be confirmed by a user. In cases where no user intervention is required, the assignment to a user can also be omitted.

According to the above example of timeout in a manufacturing process, the assignment of the processor should first be made by the corresponding assignment in the production order. If there is no improvement and the process instance and completion is delayed further, the assignment should be made via another attribute that is used to assign the process instance to the factory manager. According to the invention, it is intended that the process instances continue to be monitored by the anomaly detection engine even after an intervention in the process instance by means of a process intervention instance. The anomaly detection engine can thus determine whether there is still a timeout after a process intervention instance that has been confirmed by agents.

It can also be advantageous if the escalation of a process anomaly described above is stored as a rule in the routing engine.

In an embodiment of the invention it may be advantageous to make the set of possible generic actions for the generation of the process intervention instances dependent on the particular escalation level. For example, a generic action "Switch off machine" can be made available only to a factory manager for the creation of a corresponding process intervention instance, but not to a normal employee.

Another major advantage of the routing engine is that the process log for monitoring can be greatly reduced by the anomaly detection engine. Especially when there are a very large number of process instances (typically several million), this can ensure efficient monitoring of the process log.

Figure 4:
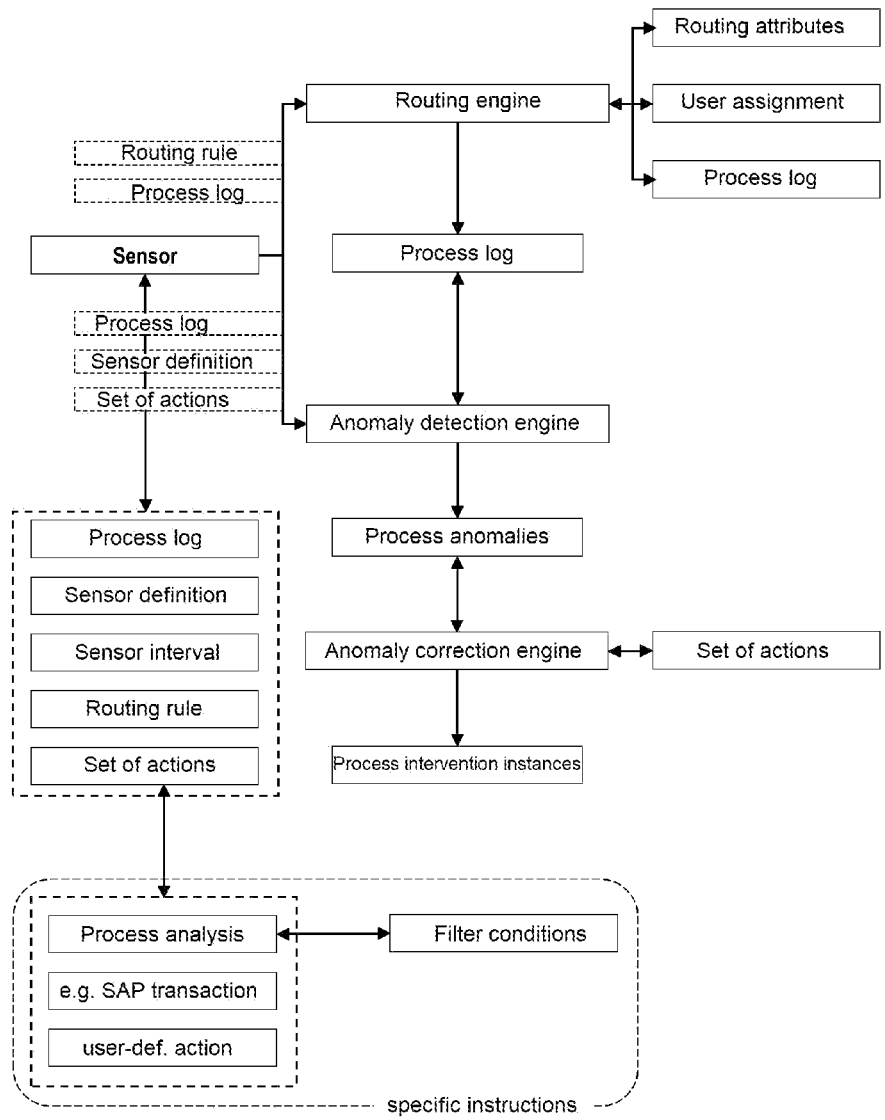
FIG. 4 shows a block diagram of the process intervention engine.

FIG. 4 shows a block diagram of a process intervention engine, showing the relationships of the anomaly detection engine, the anomaly correction engine and the routing engine for a given sensor.

The configuration of a sensor to identify a specific process anomaly includes the process log, the criteria (sensor definition) of the anomaly, the time interval of the periodic inspection of the process log for this anomaly, the allocation rule and the defined set of possible actions to eliminate the anomaly.

Based on the sensor configuration, the (optional) calculation of the filtered process log for a user based on the assignment rule is performed first. This possibly filtered process log is then made available to the anomaly detection engine. The anomaly detection engine monitors the filtered process log and determines those process instances that correspond to the sensor definition, i.e. have an anomaly according to the sensor definition. For the determined or detected process instances, the process intervention instances are generated in a further step and executed in the relevant source systems.

Figure 5:
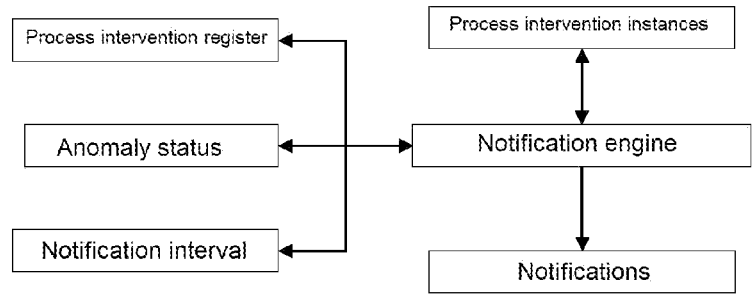
FIG. 5 shows a block diagram of the notification engine.

According to a further aspect of the invention, a notification engine can be provided, with which users can be informed about occurred process anomalies (=process instances that have an anomaly). A block diagram of a notification engine is shown in FIG. 5.

In contrast to the process intervention engine shown in FIG. 4, the notification engine does not refer to a single sensor, but includes all anomalies assigned to a specific user via different sensors. The starting point for notifying a user is therefore the set of all process intervention instances assigned to him (in FIG. 5 referred to as Process Intervention Store). This set is continuously updated according to the frequency of the sensor (sensor interval) in the sensor configuration, and the newly emerging anomalies are collected over time.

In addition to the Process Intervention Store, the process intervention register plays a decisive role in the notification process. In the process intervention register, the anomalies assigned to a user already at the time of the previous notification are recorded or registered.

The amount of new anomalies, i.e. anomalies that have occurred since the last notification, is determined by comparing the Process Intervention Store with the process intervention register. The process intervention instances that are not already part of the process intervention register are also continuously checked for their status. The status can include the validity of an anomaly—if a new anomaly is eliminated before the next notification, this anomaly can be removed from the Process Intervention Store or marked as invalid. Alternatively, for each anomaly to be transferred to the process intervention register, it is possible to check whether the anomaly still exists. This check can be performed using the anomaly detection engine. The corresponding notification is synchronized and sent at the times specified in the notification interval (for example daily from Monday to Friday at 11 a.m. and 3 p.m.). A user receives a notification with the bundled anomalies which are not yet part of the process intervention register and still exist at the time of notification.

By decoupling the intervals for the checking by the sensors of the anomaly detection engine and the sending of notifications, the timeliness of the process intervention instances can be controlled independently of the user notification. By bundling anomalies across sensors, the user can be notified centrally. By taking into account the status of the anomalies, it is ensured that the responsible agent is only informed about anomalies that actually exist.

Figure 6:
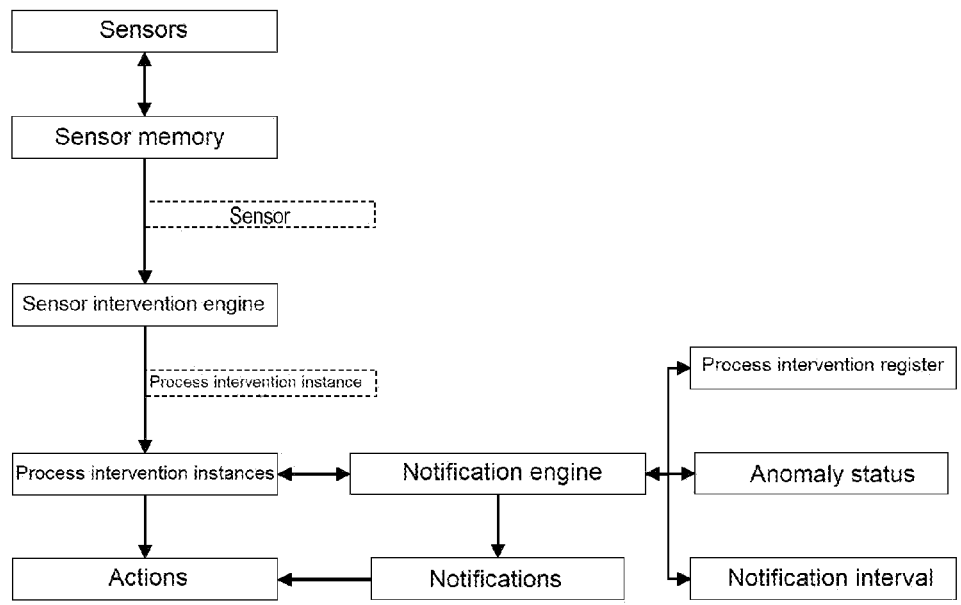
FIG. 6 shows a block diagram of an overall system of the invention.

FIG. 6 shows a block diagram of an overall system of the invention.

The anomaly correction engine and the notification engine work together to detect anomalies by creating process intervention instances to eliminate the anomalies, sending notifications, and facilitating anomaly correction.

Figure 7:
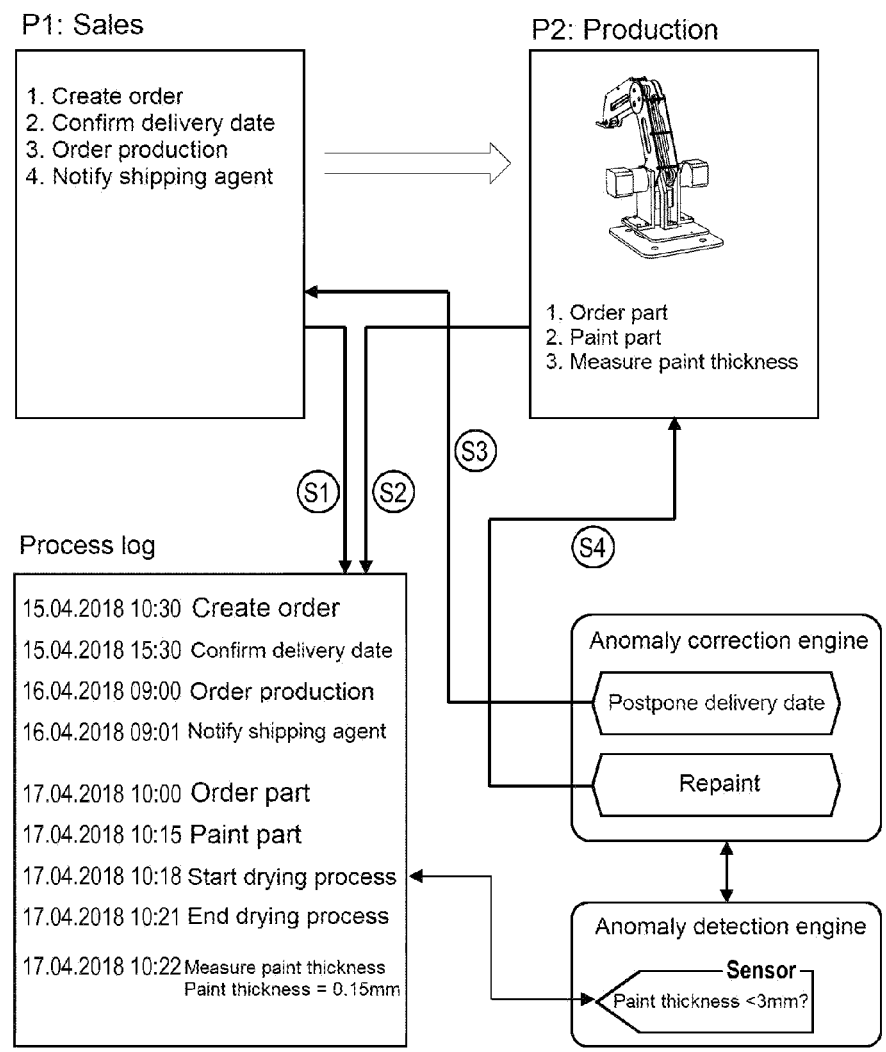
FIG. 7 shows a specific example a process instance that is being executed.

FIG. 7 shows the interaction of the source system, process log, anomaly detection engine and anomaly correction engine for a specific process instance that is currently being executed. In this example, the process instance comprises two sub-process instances P1 and P2.

The sub-process instance P1 is a sales process in which four steps have already been executed, namely the steps "Create offer," "Confirm delivery date," "Order production" and "Inform shipping agent." The sub-process instance P1 was executed in an ERP system.

Sub-process instance P2 is a production process in which a specific prefabricated component is painted according to customer requirements. In sub-process instance P2, three steps have already been carried out, namely "Request part" (for example from a parts store), "Paint part" (after painting, the part was dried), and "Measure paint thickness." Sub-process instance P2 was executed by a painting robot that has appropriate sensors for measuring the paint density.

For the two steps executed in the sub-process instances P1 and P2, corresponding entries are generated in the process log (steps S1 and S2), and, for the sake of simplicity, only the execution time and the identifier of the particular process step are shown in FIG. 7. In addition to the step "Measure paint thickness" of sub-process instance P2, the measured paint density is also stored in the process log. The entries in the process log are advantageously generated directly after the corresponding steps have been executed.

A sensor of the anomaly detection engine monitors the process log continuously (for example every two minutes). According to the example shown in FIG. 7, the sensor definition requires that the sensor monitors the process log in respect of whether a "Measure paint thickness" step has been executed within a process instance where the measured thickness is less than 3 mm.

In this example, a paint thickness of 1.5 mm was measured in the step "Measure paint thickness." A paint thickness of less than 3 mm represents a process anomaly in the sense of the present invention. The value of the minimum paint thickness of 3 mm is fixed here. However, it can also be specified dynamically, for example, from the requirements of the ordering customer.

Because the sensor has detected the above-mentioned process anomaly, it is provided in accordance with the invention to eliminate this process anomaly. For this purpose, the anomaly detection engine informs the anomaly correction engine in which process instance which anomaly has occurred. In the example shown in FIG. 7, the anomaly detection engine informs the anomaly correction engine that the process instance specified in the process log has too low a paint thickness.

For this specific process anomaly, the anomaly correction engine selects from a set of generic actions (not shown in FIG. 7) those generic actions that can be used to eliminate the process anomaly. In the present example these are the generic actions "Postpone delivery date" and "Repaint." The generic action "Postpone delivery date" is necessary here because repainting the part will delay the delivery of the part to the shipping company.

From the selected generic actions, the anomaly correction engine creates process intervention instances. The process intervention instance "Postpone delivery date" is transferred from the anomaly correction engine to the ERP system (step S3) in which the first sub-process instance P1 was executed. The process intervention instance "Repaint" is transferred from the anomaly correction engine to the production-system system (for example to the painting robot) (step S4) in which the second sub-process instance P2 was executed. When creating process intervention instances from generic actions, the process intervention instances are adjusted using a number of parameters, the values of which can be fixed or, for example, set depending on the current process instance. For example, the generic action "Postpone delivery date" can be used for different process instances of different processes to postpone a delivery date. In this example, the anomaly correction engine can calculate the delay in the availability of the part from the duration of painting and drying of the part and from the availability of the painting robot, and pass on this delay (for example 36 hours), as a parameter of the process intervention instance "Postpone delivery date."

The anomaly correction engine can pass the parameterized process intervention instances directly to the relevant source system. The source systems can then convert the particular process intervention instance into instructions that can be executed by the particular source system.

Alternatively and advantageously, however, the anomaly correction engine can generate instructions executable by the relevant source system from the process intervention instances and then transfer these instructions to the relevant source system. This has the advantage that the source systems do not have to be adapted to generate executable instructions from the process intervention instances. The creation of instructions from the process intervention instances can thus be performed centrally by the anomaly correction engine. The anomaly correction engine generates the corresponding instructions depending on the particular source system to which the instructions are to be made available.

The process intervention instances or the associated instructions are then executed by the relevant source system. For the corresponding steps (according to the executed instructions), entries can be created in the process log (not shown in FIG. 7) and can be monitored by the sensor of the anomaly detection engine. For the repainting process, the entries "Apr. 19, 2018 12:00 repaint part," "Apr. 19, 2018 12:30 start drying," "Apr. 19, 2018 12:43 drying end" and "Apr. 19, 2018 12:32 measure paint thickness; paint thickness 3.05 mm" can be created in the process log. Since the paint thickness is now greater than 3 mm, the anomaly is considered fixed according to the sensor definition of the sensor monitoring the process log.

FIG. 7 shows the interaction of source system, process log, anomaly detection engine and anomaly correction engine on the basis of a specific process instance that is currently being executed. In this example, the process instance comprises two sub-process instances P1 and P2.

The sub-process instance P1 is a sales process, in which four steps have already been performed, namely the steps "Create offer," "Confirm delivery date," "Order production" and "Inform shipping agent," The sub-process instance P1 was executed in an ERP system.

Sub-process instance P2 is a production process in which a specific prefabricated component is painted according to customer requirements. In sub-process instance P2, three steps have already been carried out, namely "Request part" (for example from a parts store), "Paint part" (after painting, the part was dried), and "Measure paint thickness." Sub-process instance P2 was executed by a painting robot that has appropriate sensors for measuring the paint density.

For the two steps executed in the sub-process instances P1 and P2, corresponding entries are generated in the process log (steps S1 and S2), and, for the sake of simplicity, only the execution time and the identifier of the particular process step are shown in FIG. 7. In addition to the step "Measure paint thickness" of sub-process instance P2, the measured paint density is also stored in the process log. The entries in the process log are advantageously generated directly after the corresponding steps have been executed.

A sensor of the anomaly detection engine monitors the process log continuously (for example every two minutes). According to the example shown in FIG. 7, the sensor definition requires that the sensor monitors the process log in respect of whether a "Measure paint thickness" step has been executed within a process instance where the measured thickness is less than 3 mm.

In this example, a paint thickness of 1.5 mm was measured in the step "Measure paint thickness." A paint thickness of less than 3 mm represents a process anomaly in the sense of the present invention. The value of the minimum paint thickness of 3 mm is fixed here. However, it can also be specified dynamically, for example, from the requirements of the ordering customer.

Because the sensor has detected the above-mentioned process anomaly, it is provided in accordance with the invention to eliminate this process anomaly. For this purpose, the anomaly detection engine informs the anomaly correction engine in which process instance which anomaly has occurred. In the example shown in FIG. 7, the anomaly detection engine informs the anomaly correction engine that the process instance specified in the process log has too low a paint thickness.

For this specific process anomaly, the anomaly correction engine selects from a set of generic actions (not shown in FIG. 7) those generic actions that can be used to eliminate the process anomaly. In the present example these are the generic actions "Postpone delivery date" and "Repaint." The generic action "Postpone delivery date" is necessary here because repainting the part will delay the delivery of the part to the shipping company.

From the selected generic actions, the anomaly correction engine creates process intervention instances. The process intervention instance "Postpone delivery date" is transferred from the anomaly correction engine to the ERP system (step S3) in which the first sub-process instance P1 was executed. The process intervention instance "Repaint" is transferred from the anomaly correction engine to the production-system system (for example to the painting robot) (step S4) in which the second sub-process instance P2 was executed. When creating process intervention instances from generic actions, the process intervention instances are adjusted using a number of parameters, the values of which can be fixed or, for example, set depending on the current process instance. For example, the generic action "Postpone delivery date" can be used for different process instances of different processes to postpone a delivery date. In this example, the anomaly correction engine can calculate the delay in the availability of the part from the duration of painting and drying of the part and from the availability of the painting robot, and pass on this delay (for example 36 hours), as a parameter of the process intervention instance "Postpone delivery date."

The anomaly correction engine can pass the parameterized process intervention instances directly to the relevant source system. The source systems can then convert the particular process intervention instance into instructions that can be executed by the particular source system.

Alternatively and advantageously, however, the anomaly correction engine can generate instructions executable by the relevant source system from the process intervention instances and then transfer these instructions to the relevant source system. This has the advantage that the source systems do not have to be adapted to generate executable instructions from the process intervention instances. The creation of instructions from the process intervention instances can thus be performed centrally by the anomaly correction engine. The anomaly correction engine generates the corresponding instructions depending on the particular source system to which the instructions are to be made available.

The process intervention instances or the associated instructions are then executed by the relevant source system. For the corresponding steps (according to the executed instructions), entries can be created in the process log (not shown in FIG. 7) and can be monitored by the sensor of the anomaly detection engine. For the repainting process, the entries "Apr. 19, 2018 12:00 repaint part," "Apr. 19, 2018 12:30 start drying," "Apr. 19, 2018 12:43 drying end" and "Apr. 19, 2018 12:32 measure paint thickness; paint thickness 3.05 mm" can be created in the process log. Since the paint thickness is now greater than 3 mm, the anomaly is considered fixed according to the sensor definition of the sensor monitoring the process log.

Figure 8:
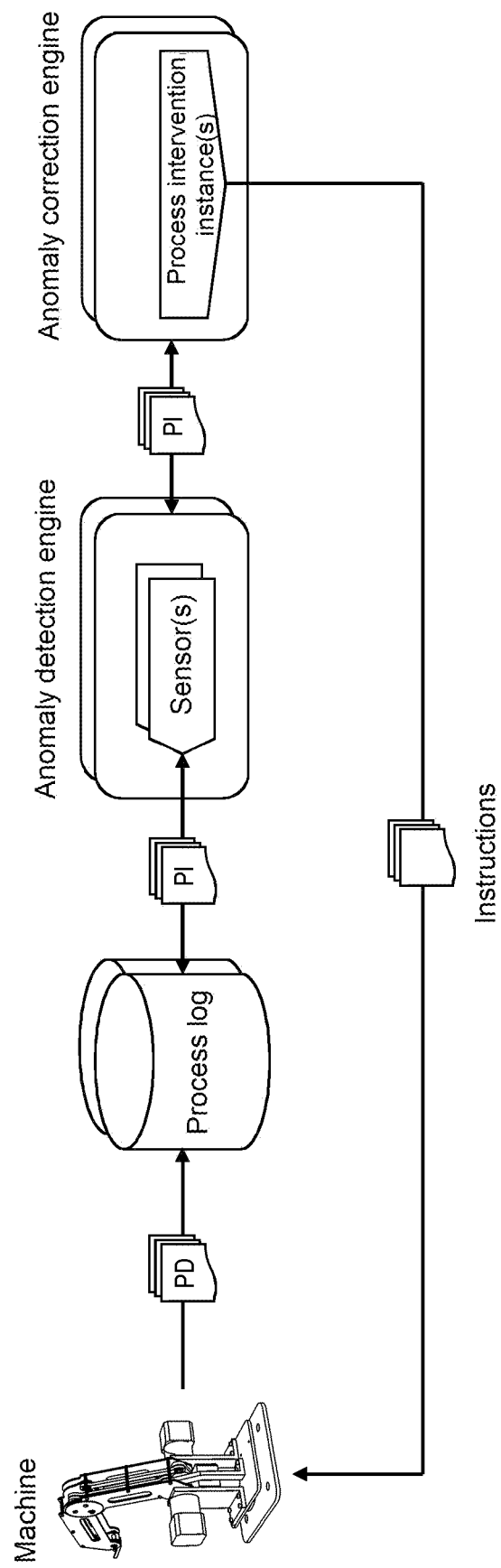
FIG. 8 shows a block diagram to illustrate the basic inventive method.

Finally, with reference to FIG. 8, the basic steps of the method according to the invention are summarized.

A machine performs a number of steps, for example of a production process. The machine can also be a computer system in which, or with which, a process (for example an ordering process in an ERP system) is executed. The process executed by the machine (=process instance) can comprise a number of process steps. Each process step generates data that are stored as process data PD in the process log. In the case of a machine, these data can include sensor data or operating parameters. In addition to these data, the process data include at least an identifier of the process instance and an identifier of the process step as well as information (for example a timestamp), with which the order of the process steps of a process instance is defined. Each process step stores the process data during the execution or immediately after the execution.

The process log can be stored in a database of a computer system connected to the machine via a communication network. It is advantageous if the database is stored in a main memory of the computer system.

An anomaly detection engine controls a sensor (or plurality of sensors) that continuously (or at certain intervals) monitors the process log and identifies faulty or anomalous process instances PI in the process log using one or more sensor definitions. Because the process data is stored in the process log during the execution or immediately after the execution of the particular process steps, faulty or anomalous process instances can already be detected during the execution of the particular process instance, i.e. before the execution of the particular process instance is completed. Depending on the time intervals at which the sensor (or the sensors) query the process log, even faulty or anomalous process instances can be detected in real time, which in turn allows real-time intervention in the particular process instance to eliminate the error or anomaly.

The anomaly detection engine transfers the detected process instances PI to the anomaly correction engine. In addition to the data of the detected process instances PI, the anomaly detection engine can also pass further data (auxiliary data) to the anomaly correction engine that describe the particular process instance in more detail. For example, this data can include information about which customer the workpiece processed by the machine is for. The anomaly detection engine can retrieve this auxiliary data from other databases and make it available to the anomaly correction engine.

In an alternative embodiment of the invention, this auxiliary data can also be queried by the anomaly correction engine, for example from other databases. This is advantageous in order to reduce the load on the anomaly detection engine, especially when very large process logs (for example with several hundred million process steps) have to be monitored in real time, if possible.

The anomaly correction engine creates process intervention instances as described above for the process instances passed on by the anomaly detection engine. These process intervention instances are designed in such a way that they can be used to control the particular process instance being executed In the example shown in FIG. 8, the anomaly correction engine creates one or more instructions for each process intervention instance and transfers them for execution to the relevant source system (=where the process instance is executed), which is the machine in the example shown in FIG. 8. It is advantageous if the instructions are adapted to the particular source system in such a way that they can be executed there directly. In the example shown in FIG. 8, the machine can be induced to execute a certain processing step, with which the detected error can be eliminated or the detected anomaly can be removed.

The anomaly detection engine and the anomaly correction engine can run on the same computer system. Alternatively, the anomaly detection engine and the anomaly correction engine may be run on separate computer systems connected by a communications network.

Figure 9:
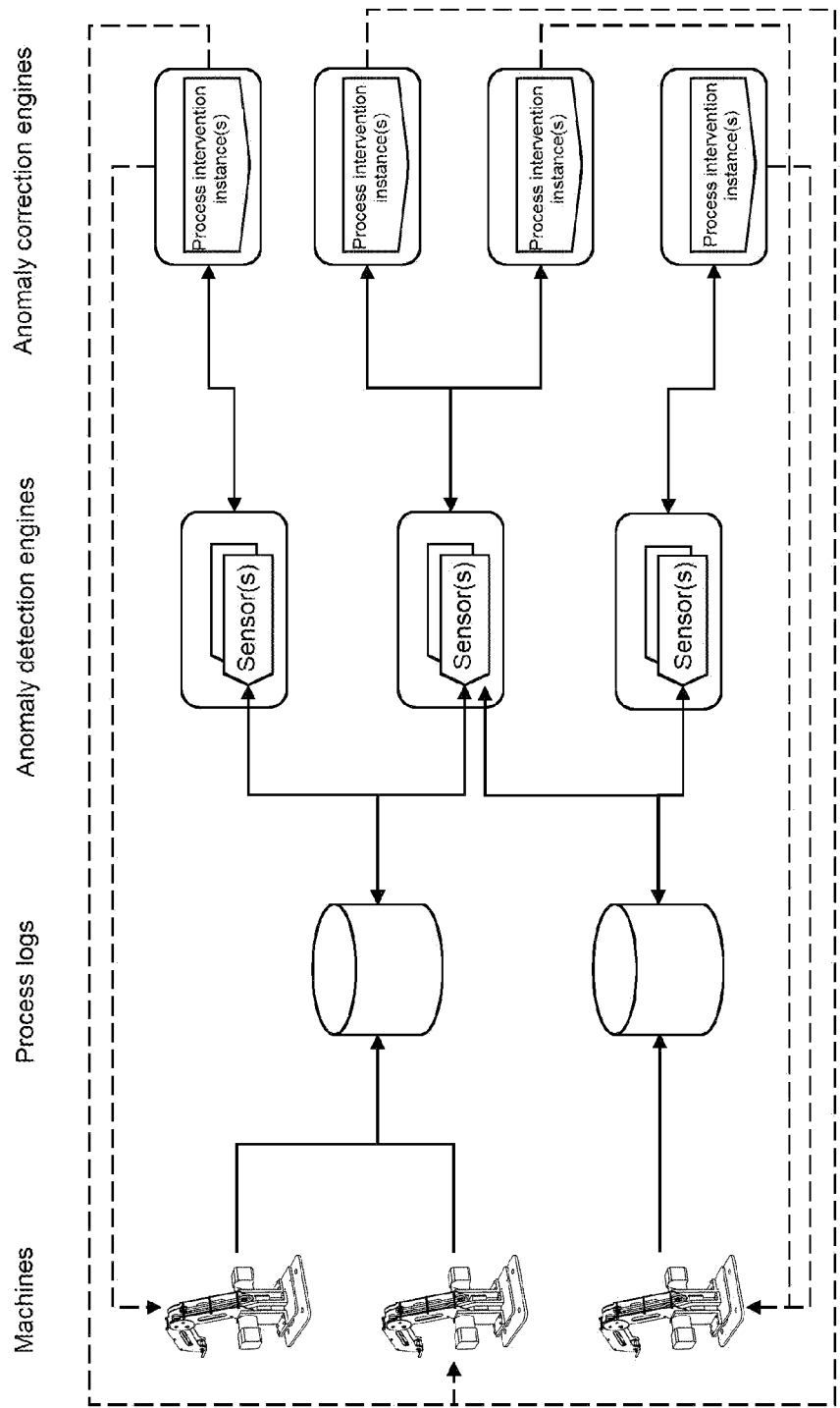
FIG. 9 shows a network of process logs, anomaly detection engines and anomaly correction engines

In an embodiment of the invention, there may be several process logs in which process data of different source systems are stored. In addition, several anomaly detection engines (each of which can control several sensors) can be provided, which monitor different process logs or monitor a process log together. Furthermore, several anomaly correction engines can be provided, each of which is adapted to eliminate specific process anomalies. Depending on the detected process anomaly, the anomaly detection engines can be adapted to pass on the detected process instance to a corresponding anomaly correction engine. This can provide a network of process logs, anomaly detection engines and anomaly correction engines, where each account is designed to perform specific tasks, as shown by way of example in FIG. 9.

The invention claimed is:

1. A computer-implemented method for monitoring process instances that are being executed and for eliminating process anomalies in said process instances, wherein each process instance comprises a number of process steps, wherein process data for the process steps already executed are stored in at least one process log, wherein the process data for each process step comprise at least an identifier of the process step, an identifier with which the process step can be uniquely assigned to a process instance, and an order of the process step within the process instance, wherein a process anomaly is described with at least one sensor definition, wherein a process anomaly is associated with a set of generic actions to eliminate the process anomaly, the generic actions each defining a specified action for correcting an anomalous process instance, wherein the generic actions are defined uniformly, and wherein (a) in a monitoring step a sensor, using the sensor definition, monitors the process log with respect to the process anomaly described in the sensor definition and detects process instances or processes comprising a plurality of process instances, that have the process anomaly described in the sensor definition, and (b) in a correction step, for a process instance detected in the monitoring step, the process anomaly is eliminated at the runtime of said process instance, wherein at least one generic action is selected from the set of generic actions assigned to the process anomaly, based on the selected generic action, a process intervention instance specific to the detected process is created and source-system-specific instructions are generated, and the process intervention instance is executed to eliminate the process anomaly of the detected process instance.

2. The method of claim 1, wherein for each process step the process data are stored in the process log during the execution of the process step or at the end of the process step.

3. The method of claim 1, wherein the sensor definition contains data and/or instructions with which, in the monitoring step, process instances and/or processes are selected from the process log that fulfil a predetermined selection criterion.

4. The method of claim 3, wherein the selection criterion can be at least one static or dynamic parameter, at least one predetermined pattern, and/or at least one parameter that can be defined by pattern recognition, wherein, in the case of a deviation or non-deviation from the selection criterion, the selection criterion is fulfilled and a deviation or non-deviation from the selection criterion is indicative of a process anomaly.

5. The method of claim 1, wherein a process instance has a number of sub-process instances, wherein the process steps of the sub-process instances can be executed in different source systems, and wherein the process data for the already executed process steps of the sub-process instances are combined in the at least one process log.

6. The method of claim 1, wherein the sensor definition includes information regarding the times at which the monitoring step is performed.

7. The method of claim 1, wherein the process log is filtered according to predetermined filter criteria before the monitoring step, and wherein the filtered process log is the basis for the monitoring step.

8. The method of claim 1, wherein the process data stored in the process log can be linked with further auxiliary data describing the particular process instance and/or the particular process step, wherein, when the process intervention instance is generated, it is parameterized with the auxiliary data.

9. The method of claim 8, wherein the process intervention instance has a number of non-invasive actions and/or a number of invasive actions, wherein the non-invasive actions are executed outside the source system in which the particular process instance is executed, and the invasive actions are executed in the source system in which the particular process instance is executed.

10. The method of claim 9, wherein with an invasive action the course of the particular process instance in the source system is changed and/or controlled.

11. The method of claim 9, wherein the non-invasive actions and/or the invasive actions are converted into executable instructions for the particular source system.

12. The method of claim 1, wherein the selection of the at least one generic action from the set of generic actions associated with the process anomaly may be performed in such a way that, for a number of actions or combinations of actions contained in the set of generic actions, a simulation is performed in which it is determined which action or combination of actions applied to the process instance leads best to a predetermined result, wherein this action or combination of actions is selected.

13. The method of claim 7, wherein the filter criterion is formed by at least one attribute of the process log and the characteristics that this attribute can assume, the characteristics being assigned to a user, wherein, by assigning the characteristics of the attribute to the user, the process anomalies occurring in the filtered process log are also assigned to this user.

14. The method of claim 1, wherein the process log is stored in a main memory of a computer system, preferably in such a way that successive process steps of a process instance are stored in adjacent memory cells.

15. The method of claim 6, wherein the monitoring step is performed by an anomaly detection engine and the correction step is performed by an anomaly correction engine, wherein the anomaly detection engine controls the execution of the sensor, the execution of the sensor being triggered according to the time points specified in the sensor definition, and the anomaly detection engine passes information about the process instances detected by the sensor to the anomaly correction engine.

* * * * *